United States Patent
Diget et al.

(10) Patent No.: US 10,927,816 B2
(45) Date of Patent: Feb. 23, 2021

(54) METHOD AND COVER FOR COVERING AN OPENING IN A COMPONENT OF A WIND TURBINE

(71) Applicant: Siemens Gamesa Renewable Energy A/S, Brande (DK)

(72) Inventors: Asp Ravn Diget, Børkop (DK); Anders Elsborg Hoejris, Herning (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 16/485,605

(22) PCT Filed: Nov. 28, 2017

(86) PCT No.: PCT/EP2017/080612
§ 371 (c)(1),
(2) Date: Aug. 13, 2019

(87) PCT Pub. No.: WO2018/149528
PCT Pub. Date: Aug. 23, 2018

(65) Prior Publication Data
US 2019/0376491 A1    Dec. 12, 2019

(30) Foreign Application Priority Data
Feb. 17, 2017    (DE) .................. 10 2017 202 581.6

(51) Int. Cl.
*F03D 13/10* (2016.01)
(52) U.S. Cl.
CPC .................... *F03D 13/10* (2016.05)

(58) Field of Classification Search
CPC .......... F03D 13/10; F03D 13/40; F03D 80/00; Y02E 10/726
See application file for complete search history.

(56) References Cited

U.S. PATENT DOCUMENTS

| 4,252,850 A | 2/1981 | de Winter |
| 4,723,751 A * | 2/1988 | Hale ...................... E04G 11/04 249/13 |

(Continued)

FOREIGN PATENT DOCUMENTS

| CN | 201474848 U | 5/2010 |
| CN | 102036852 A | 4/2011 |

(Continued)

OTHER PUBLICATIONS

International Search Report & Written Opinion dated Apr. 11, 2018 for Application No. PCT/EP2017/080612.

(Continued)

*Primary Examiner* — Rodney Mintz
(74) *Attorney, Agent, or Firm* — Schmeiser, Olsen & Watts LLP

(57) ABSTRACT

Provided is a method for temporarily covering an opening in a component of a wind turbine, including the steps: positioning a cover including an inflatable torus and a tarpaulin, whose circumference is attached to the torus, over the opening such that the torus extends around the outer circumference of a wall whose inner circumference delimits the opening and that the tarpaulin extends across the opening, and inflating the torus to attach the cover to the component.

7 Claims, 3 Drawing Sheets

(56) References Cited

U.S. PATENT DOCUMENTS

| | | | |
|---|---|---|---|
| 5,067,207 A | 11/1991 | Semons | |
| 8,016,569 B2* | 9/2011 | Stam | F03D 13/40 |
| | | | 290/44 |
| 8,272,822 B2* | 9/2012 | Casazza | B66C 1/62 |
| | | | 410/155 |
| 8,413,960 B2* | 4/2013 | Davis | F03D 80/00 |
| | | | 254/93 HP |
| 9,611,837 B2* | 4/2017 | Abolfazlian | F03D 1/00 |
| 9,624,910 B2* | 4/2017 | Kohne | E06B 9/0638 |
| 10,352,062 B2* | 7/2019 | Fletcher | F03D 80/50 |
| 10,378,508 B2* | 8/2019 | Schafer | F03D 1/0658 |
| 10,704,288 B2* | 7/2020 | Fletcher | F03D 80/50 |
| 2007/0000182 A1* | 1/2007 | Boujon | E04H 4/065 |
| | | | 52/2.17 |
| 2010/0193394 A1 | 8/2010 | Casazza | |
| 2010/0239416 A1* | 9/2010 | Mogensen | F03D 13/20 |
| | | | 415/182.1 |
| 2010/0326268 A1* | 12/2010 | Davis | F03D 80/00 |
| | | | 92/163 |
| 2011/0067792 A1 | 3/2011 | Hanisch | |
| 2011/0142613 A1 | 6/2011 | Stam et al. | |
| 2014/0030111 A1* | 1/2014 | Kohne | F03D 13/20 |
| | | | 416/244 R |
| 2014/0219812 A1* | 8/2014 | Abolfazlian | F03D 1/00 |
| | | | 416/244 R |
| 2016/0356263 A1 | 12/2016 | Schafer et al. | |
| 2017/0030327 A1* | 2/2017 | Fletcher | B23P 6/002 |
| 2019/0162172 A1* | 5/2019 | Fletcher | F03D 80/50 |
| 2019/0226460 A1* | 7/2019 | Madsen | B66C 23/207 |

FOREIGN PATENT DOCUMENTS

| | | |
|---|---|---|
| CN | 104213763 A | 12/2014 |
| CN | 104947716 A | 9/2015 |
| EP | 2213587 A1 | 8/2010 |
| EP | 2908002 A1 | 8/2015 |

OTHER PUBLICATIONS

Non-English Chinese Office Action dated May 11, 2020 for Application No. 201780086763.4.

* cited by examiner

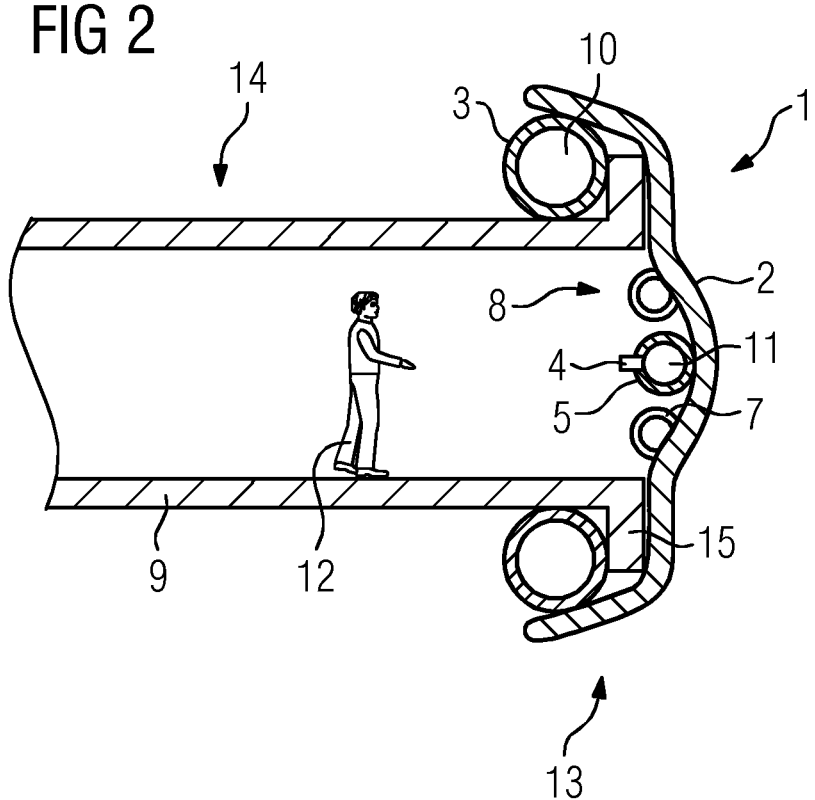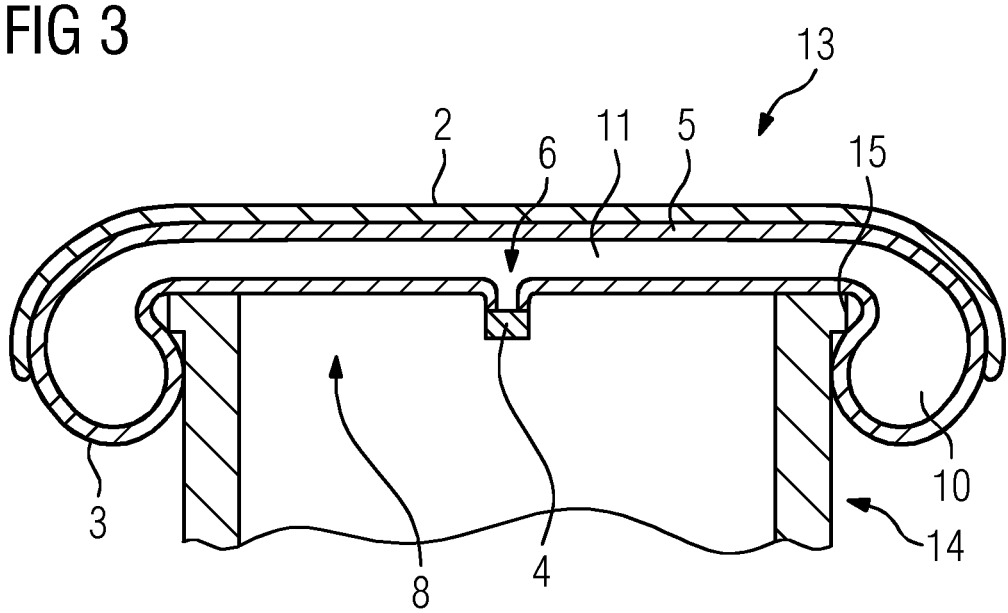

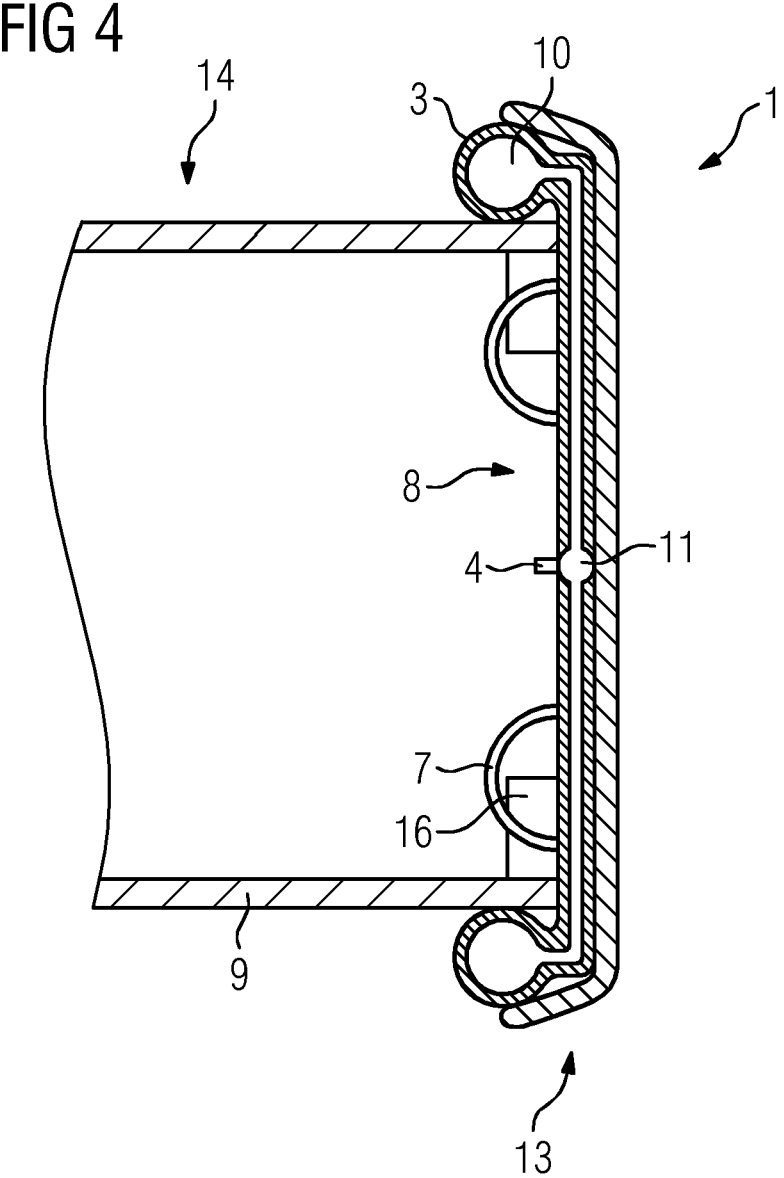

METHOD AND COVER FOR COVERING AN OPENING IN A COMPONENT OF A WIND TURBINE

CROSS-REFERENCE TO RELATED APPLICATIONS

This application claims priority to PCT Application No. PCT/EP2017/080612, having a filing date of Nov. 28, 2017, which is based on German Application No. 10 2017 202 581.6, having a filing date of Feb. 17, 2017, the entire contents both of which are hereby incorporated by reference.

FIELD OF TECHNOLOGY

The following relates to a method for temporarily covering an opening in a component of a wind turbine. It also relates to a cover and a cover arrangement.

BACKGROUND

Many components of wind turbines, e. g. the generator, tower sections and turbine blades, have open connections that connect them to other components of the wind turbine. During the construction of the wind turbine these openings are open to environmental conditions. In many cases a collection of snow and/or rain in the component or in these openings should be avoided. This is relevant e. g. in the time span between a rotation of the generator from a horizontal to a vertical position until the hub is mounted onto it. Typically, the interface of the generator towards the hub should be covered from rain and snow.

A simple approach to cover an opening is to place a tarpaulin over it. If the component should be moved while the cover is attached, the tarpaulin needs to be fixed to the component. This can be problematic, since the outside of wind turbine components is often hard to reach once a partial assembly of the wind turbine is achieved.

SUMMARY

An aspect relates to an improved way to cover openings in wind turbine components during the construction of the wind turbine.

For instance, a method for temporarily covering an opening in a component of a wind turbine comprises:
positioning a cover comprising an inflatable torus and a tarpaulin, whose circumference is attached to the torus, over the opening such that the torus extends around the outer circumference of a wall whose inner circumference delimits the opening and that the tarpaulin extends across the opening, and
inflating the torus to attach the cover to the component.

It is therefore proposed to use an inflatable torus as a carrying and support member for the tarpaulin. When the torus, that can be also considered to be a ring, is inflated, it pushes against the outer circumference of the wall and therefore "grips" the outer circumference of the opening. If the outer circumference of the wall is essentially flat, a frictional connection between the outer circumference of the wall and the torus is achieved. In many cases components of a wind turbine comprise flanges that are arranged around openings to connect the component to other components of the wind turbine. E. g. the generator can provide a flange to connected with the rotor hub. In this case the torus can engage the flange during the inflation and there will therefore be a form fit between the outer circumference of the wall, especially the flange, and the torus. In both cases a reliable connection of the tarpaulin with the wall and therefore with the component can be achieved by simply inflating the torus.

The cover can comprise a valve for inflating the torus, wherein the cover is positioned in such a way that the valve is positioned on the side of the tarpaulin that is facing the opening. In other words, the valve is arranged within the space that is surrounded by the component and the tarpaulin once the cover is attached. The valve is therefore accessible from the inside of the component. In many instances wind turbines are constructed such that the components are accessible with relative ease from the inside but hard to access from the outside. By placing the valve towards the opening and therefore towards the inside of the component the valve can be easily accessed by a workman during the construction of the wind turbine. It is therefore possible to deflate the torus and therefore disconnect the cover from the component from the inside of the component. After the torus is at least partially deflated the cover becomes flexible and can e. g. be pulled inside the component to remove it.

The valve can be spaced apart from the torus when the torus is inflated, and it can be connected to the torus with at least one inflatable air channel. Especially at least one pair of air channels can be used that from a support rod for the cover when inflated.

At least one handle can be attached to the tarpaulin, wherein the cover is positioned in such a way that the handle is positioned on the side of the tarpaulin that is facing the opening. This facilitates the removal of the cover from inside the component. To remove the cover the cover can be pulled inside the component by pulling the handle or handles, especially after the torus is deflated.

The component can be a generator, especially a direct drive generator, a tower section, a wind turbine blade, a nacelle or a hub.

The method can include a step of demounting the cover from the component, wherein the demounting includes deflating the torus. By deflating the torus, the frictional connection and/or form fit between the outer circumference of the wall and the torus can be released. Therefore, the cover can be easily removed from the opening. Deflating the torus also increases the flexibility of the cover and allows for e. g. folding the cover.

The cover can be pulled inside the component through the opening after deflating the torus. Especially the previously discussed handles can be used to pull the cover through the opening. Since the torus is deflated, the component is flexible and can e. g. be folded to be pulled inside the opening.

The cover can be demounted from the component after the component is mounted to at least one further component of the wind turbine. It can especially be dismounted after the component is arranged at its final position during the assembly of the wind turbine. In such a final position it is often hard to reach the opening of the component from the outside, since the opening can be placed at large heights. It is however often possible to reach the opening from the inside and remove the cover from the inside as discussed above.

In addition to the method for temporarily covering an opening, embodiments of the invention concern a cover for covering an opening in a component of a wind turbine, comprising a tarpaulin and an inflatable torus, wherein a circumference of the tarpaulin is attached to the torus such that the tarpaulin extends across the hole of the torus when the torus is inflated. As discussed above this allows for an easy connection of the cover to the component and an easy removal once the cover is no longer needed.

The cover can comprise a valve for inflating the torus that is spaced apart from the torus when the torus is inflated and connected to the torus via at least one inflatable air channel. The valve can especially be located near the centre of the hole once the torus is inflated. If the cover is attached in such a way that the valve is positioned on the side of the tarpaulin facing the opening of the component the valve can therefore be positioned roughly in the middle of the opening and is therefore easily accessible by a workman to inflate or deflate the torus and the air channel.

The valve can be connected to the torus via at least one pair of the inflatable air channels, wherein the pair of air channels forms a support rod extending across the hole of the torus when the torus and the air channels are inflated. Two support rods can be used that extend roughly orthogonal to each other. If multiple support rods are used, they can preferentially cross approximately at the centre of the hole of the torus and/or at the position of the valve. If multiple support rods are used, they can be arranged in such a way that the circular hole of the torus is subdivided into roughly equal segments of the circle by the support rods.

The cover can comprise at least one handle that is attached to the tarpaulin. The handle can be lashed to the tarpaulin. The handle can be arranged on the same side of the tarpaulin as the valve, especially on the side which is orientated towards the opening of the component.

The component can be a generator, especially a direct drive generator, a tower section, a wind turbine blade, a nacelle or a hub.

Additionally, embodiments of the invention concern a cover arrangement, comprising a component of a wind turbine and a cover according to embodiments of the present invention that is attached to the component. The cover arrangement can be produced by the method according to embodiments of the resent invention. The cover arrangement can use a cover comprising at least one handle and/or a valve for inflating the torus and/or one or more air channels connecting the valve to the torus, wherein these components are arranged on the side of the tarpaulin that is facing the opening of the component.

BRIEF DESCRIPTION

Some of the embodiments will be described in detail, with references to the following Figures, wherein like designations denote like members, wherein:

FIG. 2 depicts a first view of a cover arrangement according to embodiments of the present invention, assembled by a method according to embodiments of the present invention;

FIG. 3 depicts a second view of the cover arrangement according to embodiments of the present invention, assembled by the method according to embodiments of the present invention; and FIG. 4 depicts another embodiment of a cover arrangement according to embodiments of the present invention.

DETAILED DESCRIPTION

Figure 1:
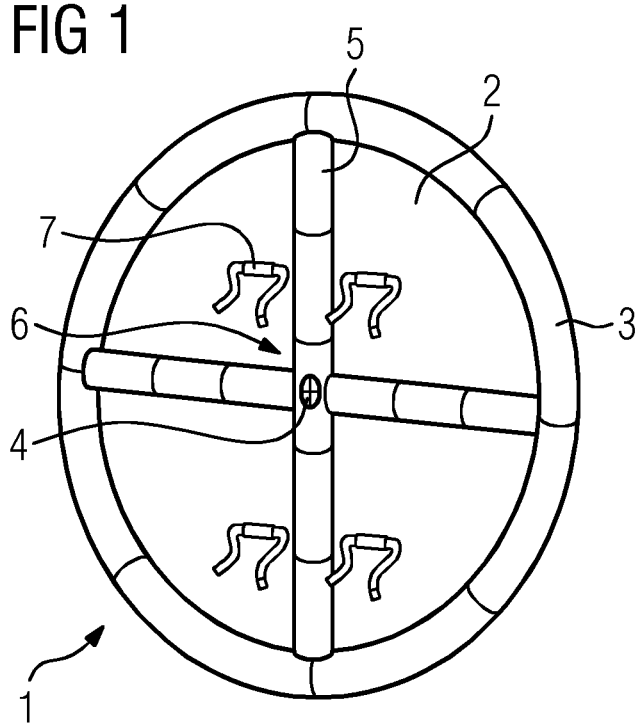
FIG. 1 depicts a cover according to embodiments of the present invention.

FIG. 1 shows a cover 1 for covering an opening in a component of a wind turbine. The cover 1 comprises an inflatable torus 3 and a tarpaulin 2 that is attached to the torus 3 via its circumference. The torus 3 is connected to a valve 4 via inflatable air channels 5. There are two pairs of air channels 5 that each form a support rod 6 that extends across the hole in the torus 3 and connects the opposite sides of the circumference of the torus 3. The air channels 5 therefore provide additional stability for the cover 1.

To allow for easier handling of the cover 1 four handles 7 are attached to the tarpaulin 2. They can be attached to the tarpaulin 2 by e. g. lashing the handles to the tarpaulin at two points each.

FIGS. 2 and 3 show different views of a cover arrangement 13, in which a cover 1 is used to cover an opening 8 of a component 14 of a wind turbine. The component 14 can e. g. be a generator, especially a direct drive generator, a tower section, a wind turbine blade, a nacelle or a hub. Only the section of the component 14 next to the opening 8 is shown in FIGS. 2 and 3. To improve clarity a slightly simplified version of the cover 1 is shown in FIGS. 2 and 3. The cover 1 comprises only one pair of air channels 5, forming a single support rod 6. Only two handles 7 are shown.

The cover 1 can be easily attached to the component 14 to form the cover arrangement 15 as shown in FIGS. 2 and 3. To attach the cover 1 to the opening 8, the cover 1 is first positioned over the opening 8 such that the torus 3 extends around the outer circumference of a wall 9 whose inner circumference delimits the opening 8 and that the tarpaulin 2 extends across the opening 8. While the cover 1 is positioned, the torus 3 and the air channels 5 are in a deflated state. Therefore, the connected inner spaces 10, 11 of the torus 3 and the air channels 5 are shrunk down to a smaller size than the size shown in FIGS. 2 and 3 and the cover 1 is quite flexible and can e. g. be folded.

Once the cover 1 is positioned as described above, the torus 3 and the air channels 5 are inflated by pumping e. g. air via the valve into the connected inner spaces 10, 11. Therefore the inner spaces 10, 11 expand and push the torus 3 against the outside of the wall 9 of the opening 8. Since the opening 8 has a flange 15 to connect further components to the opening 8, a form fit between the wall 9 and the torus 3 is formed once the torus is inflated.

Since a robust attachment of the cover 1 to the component 14 was achieved by inflating the torus 3, the component can now be easily handled to position it in different positions, attach it to the wind turbine, attach further components of the wind turbine to parts of the component 14 not covered by a cover 1 etc.

At some point during the assembly of a wind turbine the cover 1 should typically be removed again. In many cases the component 14 is already in a position where it is quite laborious to access the component 14 from the outside. The cover 1 is therefore designed in such a way, that a workman 12 can detach the cover 1 from the inside of the component 14. To remove the cover 1 the torus 3 can be deflated via the valve 4. Due to the deflation of the torus 3, the torus 3 can be moved over the flange 15 and the cover 1 can therefore be detached from the opening 8. Deflating the torus 3 also deflates the air channels 5 and therefore softens the support rod or support rods. Since the support rod or support rods 6 and the torus 3 are both flexible after a certain amount of deflation, the full cover 1 is flexible again and can be folded to pull it inside the component 14. The workman 12 can therefore pull the cover 1 inside the component 14 via the handles 7 after deflating the torus 3.

The use of the described method and cover therefore allows for an easy and reliable attachment of the cover 1 to the opening 8 and also for an easy way to detach the cover 1 from the opening, even if access to the opening 8 is only available from the inside of the component 14.

FIG. 4 shows a slightly different cover arrangement 13 than the cover arrangement shown in FIGS. 2 and 3. Only the differences between the two cover arrangements 13 will be discussed.

The component 14 shown in FIG. 4 does not comprise outside flanges. In this case the frictional forces exerted by the torus 3 on the wall 9 of the component are sufficiently strong to keep the cover 1 in place. This can be achieved by the right choice of geometry for the torus 3.

As an additional security measure, the handles 7 are used as an additional measure to secure the cover 1 to the component 14. As shown schematically in FIG. 4 the handles 7 are secured to elements 16 of the component 14. The handles 7 can therefore be used to attach the cover 1 to the component 14 during the inflation and/or deflation of the torus 3 and as an additional security measure to avoid a detachment of the cover 1 from the component 14.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method of temporarily covering an opening in a component of a wind turbine, the method comprising:

positioning a cover comprising an inflatable torus and a tarpaulin, the tarpaulin having a circumference attached to the inflatable torus, over the opening in the component such that the inflatable torus extends around an outer circumference of a wall and an inner circumference of the wall delimits the opening and that the tarpaulin extends across the opening in the component; and inflating the torus to attach the cover to the component of the wind turbine.

2. The method according to claim 1, wherein the cover comprises a valve for inflating the torus, further wherein the cover is positioned in such a way that the valve is positioned on a side of the tarpaulin that is facing the opening.

3. The method according to claim 1, wherein at least one handle is attached to the tarpaulin, and the cover is positioned in such a way that the at least one handle is positioned on a side of the tarpaulin that is facing the opening.

4. The method according to claim 1, wherein the component is a generator, a tower section, a wind turbine blade, a nacelle, or a hub.

5. The method according to claim 1, further comprising demounting the cover from the component, wherein the demounting includes deflating the torus.

6. The method according to claim 5, wherein the cover is pulled inside the component through the opening after deflating the torus.

7. The method according to claim 5, wherein the cover is demounted from the component after the component is mounted to at least one further component of the wind turbine.

* * * * *